Feb. 17, 1953
F. R. WILSON
2,628,494
ANTIFREEZE SOLUTION TESTER
Filed Oct. 25, 1950
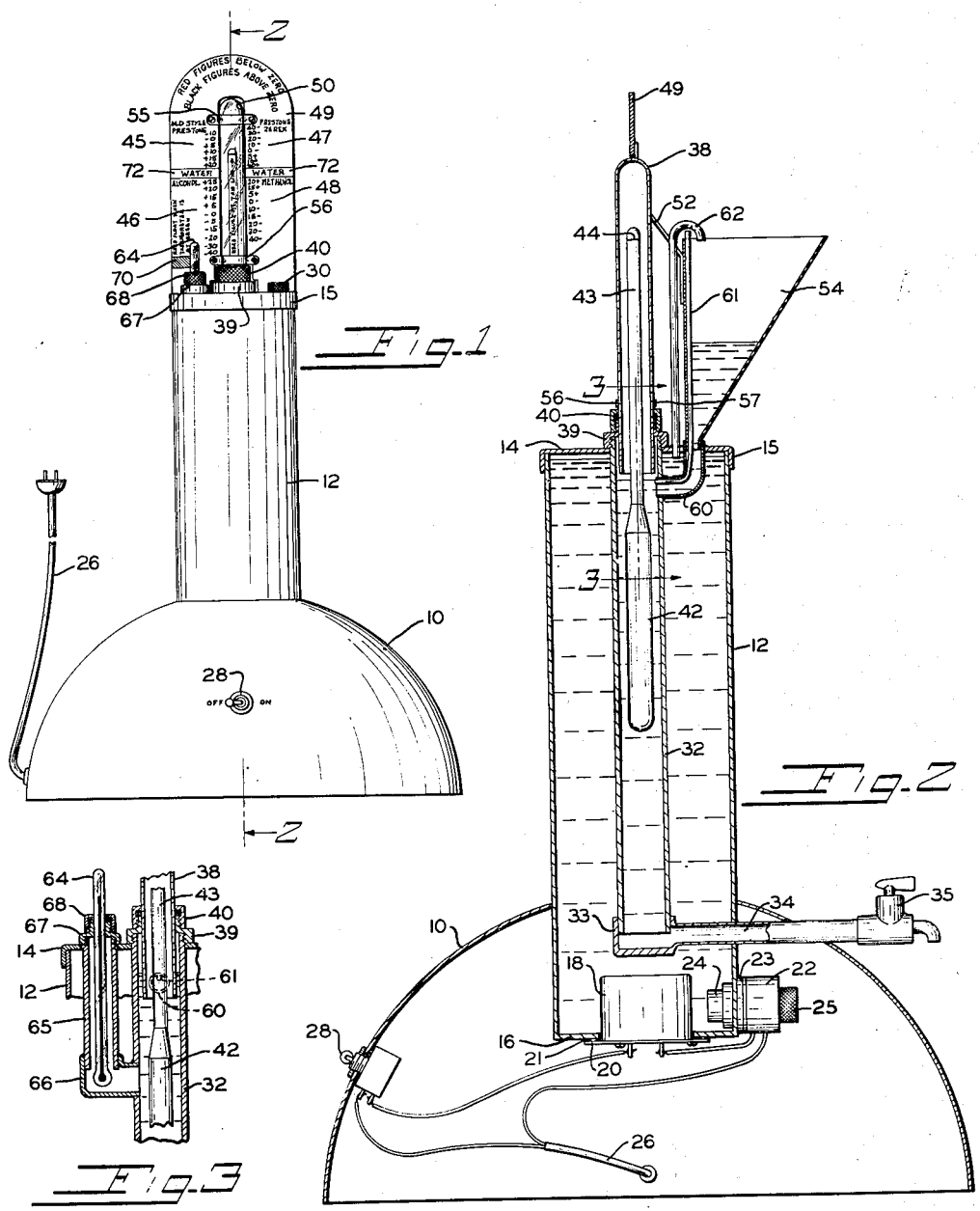
INVENTOR.
FRANK R. WILSON
BY
DES JARDINS, ROBINSON & KEISER
Howard F Keiser
HIS ATTORNEYS Patented Feb. 17, 1953

2,628,494

UNITED STATES PATENT OFFICE 2,628,494

ANTIFREEZE SOLUTION TESTER

Frank R. Wilson, Lexington, Ky.

Application October 25, 1950, Serial No. 192,079

14 Claims. (Cl. 73—34)

This invention relates to an apparatus for testing the freezing point of cooling fluids used in automobile radiators and, more particularly, to a constant level, constant temperature type of tester which is adapted to receive a specimen of the cooling solution taken from an automobile radiator and quickly and accurately determine the freezing point thereof.

When the cooling solution of an automobile radiator is tested with a conventional syringe type of hydrometer to determine its freezing point, the temperature of the solution being tested is generally disregarded with the result that the determination of the point at which the solution will freeze is inaccurate and unreliable. Moreover, in the ordinary syringe type hydrometer, the float is provided with a calibrated chart from which readings must be taken in order to determine the freezing point of the fluid being tested. This chart is difficult to read due to its small size and also because visibility thereof is impaired by the particles of rust and other foreign matter contained in the solution which tend to collect on the inner surface of the glass tube of the hydrometer and obstruct the view of the float.

In the antifreeze solution testing apparatus which I devised, these deficiencies are eliminated and a reliable, accurate reading of the density of the solution being tested may be quickly and readily obtained. At the same time, my device is of simple, rugged construction and is highly reliable in operation as will be clearly understood from the detailed description of the device forming a part of this specification.

My improved form of antifreeze solution tester is of a constant level, constant temperature type, i. e., one in which the solution undergoing test is maintained at a constant, predetermined level in the float chamber of the apparatus and in which the solution being tested is brought to and maintained at a predetermined temperature during testing of the same, thereby eliminating the need for correcting the reading provided by the instrument in order to allow for variations in temperature. By maintaining the level of the solution within the float chamber at a fixed and unvarying position, the level of the float will always be an indication of the specific gravity of the solution being tested and the float or some point thereon may be employed as a pointer or indicator. This makes possible the use of an exterior chart or scale on which the various temperatures may be inscribed and greatly simplifies and facilitates the determination of the freezing point of the solution undergoing test.

Accordingly, it is an object of this invention to provide an antifreeze solution tester of the constant level, constant temperature type which is of novel design and which is adapted to determine the freezing point of a specimen of any particular antifreeze solution in a rapid, accurate and reliable manner.

Another object of the invention is to incorporate, in an antifreeze testing device, novel means for causing the specimen of solution introduced into the device to assume a constant and predetermined level in the float chamber of the device.

Another object of the invention is to provide an antifreeze solution tester that may be employed to test the freezing point of automobile radiator fluids and the like, and which will give a safe reading even though the particular type of antifreeze material present in the cooling fluid may not be known or may be a mixture of different types of antifreeze materials.

Another object of the invention is to provide an apparatus for testing the freezing point of radiator cooling solutions which automatically differentiates between the heavier than water type and the lighter than water type of antifreeze materials, and, for either type of material, gives a direct reading from an external chart which reading is reliable and accurate regardless of the temperature of the specimen of solution when it is taken from the radiator.

Another object of the invention is to incorporate in an antifreeze solution tester a new and improved means for enabling the tester to be calibrated so as to provide accurate readings for hydrometer floats having varying characteristics.

Still a further object of the invention is to provide an antifreeze solution tester in which a single chart is provided for indicating that the specimen of solution being tested has reached a predetermined temperature and, also, for indicating the temperature at which the solution will freeze, together with an adjustable sight tube which may be moved up or down to calibrate the tester for use with hydrometer floats which are not strictly uniform in character.

Other objects and advantages of my invention will become apparent from the following detailed description, taken in connection with the accompanying drawings, in which:

Fig. 1 is a front view of an antifreeze solution tester embodying my invention.

Fig. 2 is a cross-sectional view of the tester shown in Fig. 1, this view being taken along the line 2—2 in Fig. 1.

Fig. 3 is a cross-sectional view taken along the line 3—3 in Fig. 2, with certain parts removed, to show the manner in which the liquid-column thermometer is mounted in the tester.

In general, my improved form of antifreeze solution testing apparatus comprises a hollow base member on which is mounted a vertically disposed barrel which is adapted to contain any suitable heat-transfer liquid such as water, ethylene glycol, etc. The lower portion of the barrel is received within the hollow base member where it is fitted with an electric heating element and a thermostat which may be adjusted to maintain the heat-transfer liquid at any desired temperature. Mounted within the barrel and surrounded by the heat-transfer liquid, is a float chamber for receiving and containing the specimen of antifreeze solution to be tested. The upper end of the float chamber projects up through the cap closing the upper end of the barrel. Attached to the upper end of the float chamber is a transparent sighting tube which is closed at its upper end and open at its lower end so as to form an air trap and prevent the solution being tested from rising within the tube. A suitable packing gland is provided on the upper end of the float chamber for enabling an air tight connection to be effected between the sighting tube and the float chamber in any adjusted position of the tube.

The float chamber is adapted to be filled with the antifreeze solution to be tested by means of a funnel, the lower end of which is connected by a tube with an aperture formed in the side wall of the float chamber near the upper end thereof. A small vent tube is provided for permitting air to escape from the upper end of the float chamber while the latter is being filled with solution through the funnel, the lower end of this vent tube preferably being located within the float chamber at approximately the same level as the aperture in the wall of the chamber to which the funnel is connected. Hence, liquid from the funnel may enter the test chamber until the lower end of the vent tube is closed by the liquid whereupon the air in the upper end of the chamber will be trapped and prevent additional liquid from entering the chamber. In this way, means is provided for preventing the level of the solution in the float chamber from rising above the lower end of the vent tube and, by pouring the solution to be tested into the funnel until the liquid backs up therein, the level of the solution in the float chamber may be caused to invariably assume a predetermined level within the chamber.

Located within the float chamber is a hydrometer float having a narrow, upwardly extending stem which is adapted to be received within the transparent sight tube. This stem is provided with an index which is adapted to cooperate with a series of freezing point scales provided on a chart located on the exterior of the tube. Also viewable by the attendant and cooperating with the chart is the stem of a liquid-column thermometer which is responsive to the temperature of the solution contained within the float chamber. The upper portion of this thermometer is arranged to cooperate with an index provided on the chart for indicating when the solution in the float chamber has reached the proper temperature for taking a reading from the freezing point scales inscribed on the chart.

In case it should be found necessary to calibrate the hydrometer float so as to obtain an accurate reading on the freezing point scales, the sighting tube may be adjusted up or down within the upper end of the float chamber until a position is found in which the index on the float provides an accurate reading on the freezing point scales. In this way, the tester may be calibrated or rendered accurate without adjustment of the chart which would throw off the adjustment of the thermometer with respect to its index on the chart. In other words, by rendering the chart stationary and providing for the independent calibration of the hydrometer float and the thermometer, the problem of adjusting the tester is greatly facilitated because the calibration of the float is independent of the calibration of the thermometer and adjustment of one will not effect the adjustment of the other.

Referring now to the accompanying drawings in which I have illustrated a preferred embodiment of my invention, it will be seen from Figs. 1 and 2 that my tester is provided with a hollow base member 10 which is hemispherical in shape and may be formed of metal or plastic as may be desired. As illustrated in Fig. 2, the base member 10 is merely a thin shell which is hollow inside so that it may serve to accommodate certain portions of the tester as will hereafter be described.

Mounted on the base member 10 is a barrel 12, preferably constructed of metal, the lower end of which is received within the interior of the hollow base member and the upper portion of which projects upwardly out of the base member as shown in the drawings. The barrel 12 is closed at its upper end by a cap 14 having a downwardly turned flange 15 which surrounds the upper end of the barrel and may be secured thereto in any desired manner. At its lower end, the barrel is provided with a closure 16 on which is mounted an electric heating element 18 which extends upwardly inside the barrel and is secured to the closure 16 by means of a flange 20. A sealing gasket 21 is interposed between the flange 20 and the bottom of the closure 16 so as to form a liquid tight seal between the flange and the closure when the former is drawn up tightly against the latter by means of screws (not shown).

Also mounted on the lower end of the barrel and within the confines of the hollow base member 10 is a thermostatically controlled switch 22 which is mounted in a bushing 23 secured in the sidewall of the barrel 12. A button or projection 24 on the switch 22 projects into the interior of the barrel 12. Exteriorly of the barrel, the switch is provided with a thumb knob 25 whereby the contacts thereof may be caused to open and close at any desired temperature by suitable positioning of the thumb knob.

Electrical current is supplied to the heating element 18 and switch 22 by means of a line cord 26 and an off-on toggle switch 28, the switch 22, heating element 18 and switch 22 all being connected in series across the line so that when the toggle switch 28 is off, no current can flow through the heating element 18 or thermostatically controlled switch 22. When the toggle switch 28 is on, the flow of current through the heating element 18 will be controlled by the switch 22 which operates to turn the current to the heating element on and off as may be required to maintain the temperature of the liquid in the barrel 12 at the proper temperature.

Mounted on the cap 14 which closes the upper end of the barrel 12, is a filler cap 30 (Fig. 1) which may be removed so as to enable the barrel to be filled with a suitable heat-transfer liquid such as water, ethylene glycol, etc.

Supported within the barrel 12 is a cylindrical float chamber 32 which, at its upper end, projects through the cap 14 where it is provided with a series of external screw threads. The chamber 32 is preferably constructed of a material which is a good conductor of heat such as brass, copper, or similar metal, and is secured at its upper end to the cap 14 by brazing or soldering as best suits the purpose. At its lower end, the chamber 32 is closed by a fitting 33 to which is connected a tube 34 which passes through an aperture provided therefor in the sidewall of barrel 12 and through another aperture provided in the base member 10 where it is provided with a drain cock 35.

Mounted on the upper end of the float chamber 32 is a transparent sighting tube 38 which is closed at its upper end and open at its lower end as shown in Fig. 2. The sighting tube 38 is of circular cross-section and, at its lower end, passes through the threaded neck of a coupling nut 39 which is screwed onto the upper end of the chamber 32. An air tight connection is effected between the sighting tube 38 and the upper end of the float chamber 32 by means of a packing gland 40 which may be screwed down onto the threaded neck of the nut 39. By loosening the packing gland 40, the tube 38 may be adjusted up and down on the upper end of the chamber 32 and, after it has been set to the position desired, may be securely held in such position by tightening the packing gland 40.

Located within the float member is a hydrometer float 42 which, in accordance with customary practice, is weighted at its lower end and at its upper end is provided with an upwardly extending stem 43 which extends up into, and is visible through, the sighting tube 38. Near its upper end, the stem 43 is provided with an index 44 which is adapted to cooperate with scales 45, 46, 47 and 48 provided on a tablet 49. This tablet is formed of thin sheet material which is provided with an elongated opening 50 which is shaped to conform to the outline of the sighting tube 38, packing gland 40 and coupling nut 39. The tablet 49 may thus be placed over the sighting tube, as shown in the drawing, and held in position by means of an angular bracket 52 which lies behind the tablet as illustrated in Fig. 2. At its lower end, the bracket 52 is secured to the forward wall of a filling funnel 54 which is supported on the upper end of barrel 12 in a manner later to be described. The tablet 49 is secured to the upper end of the bracket 52 by fastening screws which pass through the ends of a strap 55, through the tablet 49, and screw into the bracket 52. At its lower end, the tablet 49 is held in position with respect to tube 38 by means of front and rear straps 56 and 57, respectively, which encircle the tube and are clamped together at either end by means of screws passing through apertures provided in the tablet 49.

As seen in Fig. 2, the lower end of the funnel 54 is received within and secured to the upper end of an elbow 60 the other end of which is received within an aperture provided therefor in the upper end of chamber 32. The ends of the elbow 60 are secured to the cap 14 and chamber 32 in any suitable manner, such as by soldering, brazing, etc.

Extending downwardly through the funnel 54 and elbow 60 is a vent tube 61 which, at its upper end, terminates just above the top edge of the funnel 54 and, at its lower end, terminates at the end of the elbow 60. The vent tube 61 is provided for the purpose of permitting air to escape from the upper end of the float chamber 32 while it is being filled through the funnel 54 with a specimen of the solution to be tested. When the solution within the chamber 32 reaches the level of the lower end of vent tube 61, the solution will close off the lower end of the tube and thereby prevent any further escape of air from the upper end of the chamber 32. Hence, an air trap will be provided in the chamber 32, above the lower end of vent tube 61, which will prevent the solution poured into the funnel 54 from rising above the level of the lower end of tube 61 and cause the excess fluid to back up in the funnel 54. Therefore, by filling the funnel 54 until the solution backs up therein, the attendant can be sure that the solution within the float chamber will have reached and come to rest at the level defined by the lower end of tube 61.

Means is also provided for venting the top of the barrel 12 to the outside atmosphere so as to guard against pressure building up within the barrel. As shown in Fig. 2 this venting of the barrel is accomplished by means of a tube 62 the lower end of which passes through the cap 14 to which it is secured by soldering or brazing. The upper end of the tube is curved or bent over the edge of the funnel 54. Hence, should any boiling of the fluid within the barrel 12 take place due to failure of the thermostatically controlled switch 22, the fluid and vapors passing up through the tube 62 will be discharged into the funnel 54 from whence they will pass into the float chamber 32 and may thereafter be drawn off through the drain cock 35.

For the purpose of indicating to the attendant using the testing apparatus when the temperature of the solution in the float chamber 32 has reached the proper temperature for testing, a liquid-column thermometer 64 is provided which will respond to the temperature of the solution contained within the float chamber and indicate on the tablet 49 when this temperature is within the proper reading range. The manner in which the thermometer 64 is arranged in the testing apparatus is shown in detail in Fig. 3. As there shown, the thermometer stem is received within a tube 65 which, at its upper end, passes through an aperture provided therefor in the cap 14 to which the tube is suitably secured. Fastened to the lower end of the tube is an angular fitting 66 which is communicatively connected with the interior of the float chamber by a horizontal extension passing through an aperture provided in the wall of the chamber, the extension being secured and sealed to the wall of the chamber 32 in any desired manner. The upper end of the tube 65, which projects through the cap 14, is provided with external screw threads for receiving a coupling nut 67. This nut is provided with a threaded neck having a bore through which the stem of the thermometer passes. A packing gland 68 is adapted to screw onto the threaded neck of the nut 67 so as to secure the thermometer in any position to which it may be adjusted and also to provide an air tight seal between the thermometer stem and the interior of the tube 65. In this manner, when the float chamber 32 is filled with the solution to be tested, the solution will flow into the fitting 66 and surround the bulb of the thermometer 64 but will be prevented from rising within the tube 65 due to the airtight seal provided by packing gland 68. Since the bulb of the thermometer is immersed in the solution filling the float chamber 32, the thermometer will provide an indication of the temperature of the solution and this indication will be visible to the attendant inasmuch as the upper end of the thermometer projects upwardly beyond the packing gland 68 where it will be exposed to view. The thermometer is so located in the apparatus that the upper end thereof will lie immediately in front of the tablet 49. There is provided on the tablet adjacent the upper end of the thermometer an index or zone 70 which cooperates with the top of the liquid column of the thermometer to indicate when the temperature of the solution within the float chamber is at the proper point for taking a reading from the hydrometer portion of the device.

As previously described and as clearly seen from Fig. 3, the thermometer 64 may be adjusted up or down within the tube 65 upon loosening the packing gland 68 so as to enable the reading provided by the thermometer in cooperation with the zone 70 to be calibrated for the temperature setting of the thermostatically controlled switch 22. For example, if the thumb knob 25 of the switch 22 is set to read 150°, then the thermometer 64 should be adjusted up or down within the tube 65 until the top of the liquid column is located at the center of the index 70 when the solution within the float chamber 32 is at a temperature of 150°.

In a similar manner the hydrometer portion of the instrument may be calibrated to give accurate readings on the freezing point scales provided on the tablet 49 by loosening the packing gland 40 and adjusting the sighting tube 38 up or down so as to depress or elevate the level of the solution surrounding the float as determined by the bottom of the sighting tube. Since the tube 38 is closed at its upper end, an air trap will be formed within the tube so as to prevent fluid from rising therein even though the lower end of the tube be below the level of the fluid contained within the float chamber 32 as determined by the lower end of the vent tube 61. As shown in Fig. 3, the lower end of the sighting tube 38 is situated below the lower end of the vent tube 61 thereby effectively depressing the level of the fluid within the float chamber insofar as the hydrometer float 42 is concerned. If, when the lower edge of the tube 38 is located as shown in Fig. 3, a correct reading is obtained with the average hydrometer float, then floats which tend to float higher or lower than the average may be compensated for by lowering or elevating the sighting tube 38 so as to bring the index 44 at the proper point on the freezing point scales 45 to 48, inclusive. The maximum elevation of the index 44 would, of course, be obtained by elevating the sighting tube 38 to its extreme upper position as shown in Fig. 2 where the bottom edge of the tube is above the level of the solution within the chamber as determined by the lower end of the vent tube 61.

Referring now to Fig. 1 where the arrangement of the freezing point scales 45 to 48 inclusive on the tablet 49 are shown, it will be observed that two upper scales 45 and 47 are provided for indicating the freezing point of solutions which contain antifreeze materials having a specific gravity greater than that of water. In a similar manner, two lower scales 46 and 48 are provided for indicating the freezing point of solutions which contain an antifreeze material having a specific gravity lower than that of water. The upper and lower scales are separated by a zone 72 marked "Water" which, of course, indicates the level to which the index 44 will rise if a specimen of water is introduced within the float chamber 32. It is also to be noted that the freezing point scales 45 and 46 located along the left-hand edge of the sighting tube 38 provide readings for solutions which contain the less effective types of antifreeze materials while the scales 47 and 48 located along the right-hand edge of the sighting tube provide readings for the more effective types of antifreeze materials. Hence, if the type of antifree material incorporated in the specimen of coolant taken from the automobile radiator is unknown, a safe reading may be obtained by using the scales 45 and 46. Likewise, if a mixture of antifreeze materials have been introduced into the coolant fluid in the radiator, the scales 45 and 46 will provide a safe reading of the temperature at which the solution will freeze. It will also be seen that, in the event the operator of the motor vehicle is in doubt as to whether an ethylene glycol type of antifreeze material has been used in the radiator or whether an alcohol type of antifreeze material has been placed therein, the testing apparatus herein disclosed will immediately reveal which type of material has been used since the index 44 will lie above the zone 72 if an ethylene glycol type of material is present and below this zone if an alcohol antifreeze material is contained in the solution being tested.

My novel antifreeze solution tester is quite simple to use and requires a minimum amount of care and skill in obtaining accurate readings therefrom. The operation of the tester is as follows: Assuming that the line cord 26 has been plugged into a suitable power outlet and that the toggle switch 28 has been switched on for a sufficient length of time to cause the heat-transfer fluid contained within the barrel 12 to be brought up to the operating temperature as determined by the setting of the thermostatically controlled switch 22, the attendant first insures that the float chamber 32 is empty and that the drain cock 35 is closed so as to prevent fluid supplied to the chamber from escaping therefrom. He then takes a specimen of the antifreeze solution from the radiator of the automobile and introduces the specimen into the funnel 54 so as to fill the float chamber with the solution to be tested. As soon as the attendant observes that the solution is backing up in the funnel 54, he can be certain that the float chamber is filled to the constant, predetermined level determined by the lower end of the vent tube 61. The attendant then observes the thermometer 64 and, as soon as the top of the liquid column within the thermometer has arrived at the index or zone 70, he may be certain that the solution within the float chamber 32 has been brought to the proper reading temperature and he may proceed to read the freezing point of the solution from the freezing point scales 45 to 48, inclusive. If the type of antifreeze material contained in the radiator solution is unknown, a safe reading may be taken from the scales 45 and 46 which indicate the freezing point of solutions containing antifreeze materials of the less effective types. If the type of antifreeze material incorporated in the cooling fluid of the radiator is known, then, of course, the proper freezing point scale may be chosen. After the reading has been taken from the device, the solution contained within the chamber 32 and funnel 54 may be removed by opening drain cock 35 and permitting the solution to drain into any suitable receptacle. The solution may then either be discarded or be returned to the radiator of the vehicle as may be desired.

From the foregoing description of my improved antifreeze solution tester, it will be seen that I have provided a reliable, accurate and sturdy type of instrument which may be used with good results by persons who are not particularly skilled in the use of instruments for determining the specific gravity of fluids such as those used in the cooling systems of automobile engines. By the use of my apparatus it is possible for an attendant to quickly and surely advise the operator of the motor vehicle of the temperature which the antifreeze solution will withstand before freezing.

I am aware that the device herein described is susceptible of considerable variation without departing from the spirit of my invention and, therefore, I have claimed my invention broadly as indicated by the appended claims.

Having thus described my invention, what I claim as new and useful and desire to secure by United States Letters Patent, is:

1. A device for testing the freezing point of an antifreeze solution comprising a vertically disposed float chamber for receiving the solution to be tested, a hydrometer float in said chamber for floating in the solution contained therein, a transparent tube received in the upper end of said chamber, said tube being closed at the top and open at the bottom to form an air trap whereby the solution being tested will be prevented from rising in said tube, an elongated stem on said hydrometer float adapted to extend upwardly into said tube, an index on said stem, a tablet lying adjacent to said tube and mounted in fixed relation with respect to said float chamber, a scale on said tablet cooperating with said index for providing a reading of the freezing point of the solution, and means for adjustably securing said tube in the upper end of said chamber so that the tube may be moved in or out of said chamber to calibrate the device for different hydrometer floats.

2. In combination with a testing device of the character described in claim 1, a barrel surrounding said float chamber, a liquid in said barrel, and means for maintaining said liquid at a predetermined temperature.

3. In an apparatus for testing the freezing point of an antifreeze solution, the combination of a hollow base member, a liquid containing barrel supported in a vertical position on said base member, said barrel having a top portion projecting upwardly from said base member and a bottom portion located within the confines of said member, a test chamber having walls of heat-conducting material located inside said barrel, means for introducing a sample of the solution to be tested into said chamber, means within said chamber for determining the specific gravity of the sample introduced therein, and means for causing the sample contained in said chamber to be brought to a predetermined temperature, said last-mentioned means including a closure for the bottom of said barrel, an electric heating element mounted on said closure for heating the liquid in said barrel, and a thermostatically controlled switch mounted on the bottom portion of said barrel within said base member and in heat-transfer relationship with respect to the liquid contained in said barrel for so regulating the operation of said heating element as to maintain the liquid contained in said barrel at a constant temperature.

4. A testing apparatus of the character defined in claim 3 wherein a manipulative member is mounted on said thermostatically controlled switch for adjusting the temperature at which said switch will operate.

5. In an apparatus for testing and indicating the freezing point of an antifreeze solution, the combination of a hollow base member, a liquid containing barrel supported in a vertical position on said base member, said barrel having a top portion projecting upwardly from said base and a bottom portion located within the confines of said base member, a float chamber formed of heat-conducting material located inside said barrel, said chamber being adapted to receive the solution to be tested, a hydrometer float in said chamber, said float having an upwardly extending stem, a transparent sighting tube attached to the top of said float chamber and projecting above the top of said barrel for receiving the stem of said float, a tablet located adjacent to said sighting tube, a freezing point scale provided on said tablet, and an index on the stem of said float adapted to cooperate with said scale for indicating the freezing point of the solution being tested.

6. A testing apparatus of the character defined in claim 5, including means for introducing a sample of the solution to be tested into said float chamber, and means for causing the sample introduced therein to be brought to a predetermined temperature, said last-mentioned means including a closure for the bottom of said barrel, an electric heating element mounted on said closure for heating the liquid in said barrel, and a thermostatically controlled switch mounted on the bottom portion of said barrel within said base member and in heat-transfer relationship with respect to the liquid contained in said barrel, said switch being adapted to regulate the operation of said heating element so as to maintain the liquid in said barrel at a constant temperature.

7. In an apparatus for testing the freezing point of an antifreeze solution, the combination of a float chamber, a transparent sighting tube closed at its upper end and open at its lower end, means for attaching the lower end of said tube to the top of said chamber and for providing an airtight seal between said tube and said chamber, a hydrometer float in said chamber, said float having a stem extending upwardly into said sighting tube, and means for filling said chamber to a predetermined level with the solution to be tested, said means including an aperture in the sidewall of said chamber, a funnel located exteriorly of said chamber and above said aperture, a tube connecting the lower end of said funnel with said aperture, and a vent tube communicatively connecting the interior of said chamber with the outside atmosphere, the lower end of said vent tube being located at approximately the same level in said chamber as said aperture.

8. An apparatus of the character defined by claim 7 wherein said vent tube is disposed within said connecting tube and funnel.

9. In a device for testing and indicating the freezing point of an antifreeze solution, the combination of a vertically disposed cylindrical float chamber for receiving the solution to be tested, a transparent sighting tube having an outside diameter which is less than the inside diameter of said chamber, the upper end of said tube being closed and the lower end thereof being open, the lower end of said tube being adjustably and telescopically received within the upper end of said chamber, a packing gland for providing an airtight seal between said tube and said chamber in any position of said tube, a hydrometer float in said chamber, said float having a stem extending upwardly into said tube, an index on said stem, a tablet located adjacent said sighting tube and mounted in fixed relation with respect to said float chamber, a freezing point scale provided on said tablet for cooperating with said index to provide an indication of the freezing point of the solution being tested, and means for filling said chamber to a predetermined level with the solution to be tested, said means including an aperture in the sidewall of said chamber, a funnel located exteriorly of said chamber and above said aperture, a tube connecting the lower end of said funnel with said aperture, and a vent tube for communicatively connecting the interior of said chamber with the outside atmosphere, the lower end of said vent tube being located at approximately the same level in said chamber as said aperture.

10. In combination with a testing and indicating device of the character defined by claim 9, a barrel surrounding said float chamber, a heat-transfer liquid in said barrel, and means for maintaining said liquid at a predetermined temperature.

11. In an apparatus for determining the freezing point of an antifreeze solution, the combination of a float chamber for receiving and containing the solution to be tested, a hydrometer float free to move vertically within said chamber, a transparent sighting tube received within the upper end of said chamber, said tube being closed at the top and open at the bottom to form an air trap whereby the solution being tested will be prevented from rising in said tube, an upwardly extending stem on said float receivable within said tube, and index on said stem, a tablet located adjacent said tube and in fixed relation with respect to said chamber, a freezing point scale on said tablet for cooperating with said index to provide an indication of the freezing point of the solution being tested, a barrel surrounding the float chamber, a heat-transfer liquid in said barrel, means for maintaining said liquid at a predetermined temperature, a liquid-column thermometer responsive to the temperature of the solution in said float chamber, an index on said tablet cooperating with said thermometer for indicating when the solution in said chamber has reached the proper testing temperature, and means for adjustably securing said sighting tube in the upper end of said chamber so that the tube may be moved in or out of said chamber to calibrate the apparatus for hydrometer floats of varying characteristics.

12. In an apparatus for determining the freezing point of an antifreeze solution, the combination of a float chamber for receiving a specimen of the solution to be tested, a funnel communicatively connected with the top of said chamber for filling said chamber with the specimen of the solution, a drain cock communicatively connected with the bottom of said chamber for enabling the specimen of solution to be removed from said chamber, a barrel surrounding said float chamber, a heat-transfer liquid in said barrel, means for maintaining said liquid at a predetermined temperature including an electric heating element and a thermostatically controlled switch, and a vent tube communicatively connecting the top of said barrel with said funnel for causing liquid in said barrel to be discharged into said funnel in event of boiling up of the liquid within said barrel.

13. In a device for determining the freezing point of an antifreeze solution, the combination of a float chamber made of heat-conducting material for receiving and containing a specimen of the solution whose freezing point is to be determined, means surrounding said chamber for maintaining the chamber and its contents at a predetermined temperature, a hydrometer float located within said chamber, a transparent sighting tube attached to the upper end of said chamber, a stem on said float extending upwardly into said tube, an index on said stem, a tablet situated adjacent to said tube, and a pair of freezing point scales provided on said tablet, said scales being disposed on opposite sides of said tube and cooperable with said index to provide a reading of the freezing point of the solution, one of said scales providing an indication of the freezing point when the antifreeze material in the solution is of a highly effective type and the other of said scales providing an indication of the freezing point when the antifreze material in the solution is of a less effective type.

14. In a device for determining the freezing point of an antifreeze solution, the combination of a float chamber made of heat-conducting material for receiving and containing a specimen of the solution whose freezing point is to be determined, means surrounding said chamber for maintaining the chamber and its contents at predetermined temperature, a hydrometer float located within said chamber, a transparent sighting tube attached to the upper end of said chamber, a stem on said float extending upwardly into said tube, an index on said stem, a tablet situated adjacent to said tube, and four freezing point scales provided on said tablet and cooperating with said index to provide a reading of the freezing point of the solution, the scales extending along opposite sides of said tube, the upper two scales cooperating with the index to indicate the freezing point of solutions having a density greater than that of water, and the lower two scales cooperating with the index to indicate the freezing point of solutions having a density less than that of water, and the scales on one side of said tube indicating the freezing point of solutions containing antifreeze materials of the more effective types, and the scales on the other side of said tube indicating the freezing point of solutions containing antifreeze materials of the less effective types.

FRANK R. WILSON.

REFERENCES CITED

The following references are of record in the file of this patent:

UNITED STATES PATENTS

| Number | Name | Date |
| --- | --- | --- |
| Re. 2,347 | Bee | Sept. 4, 1866 |
| 2,129,617 | Hill | Sept. 6, 1938 |
| 2,212,809 | Ericson | Aug. 27, 1940 |
| 2,322,814 | Binckley | June 29, 1943 |

FOREIGN PATENTS

| Number | Country | Date |
| --- | --- | --- |
| 602,646 | Great Britain | May 31, 1948 |